United States Patent
Hammons, Jr.

(10) Patent No.: US 6,601,214 B1
(45) Date of Patent: Jul. 29, 2003

(54) SYSTEM AND METHOD EMPLOYING A RATE MATCHING ALGORITHM FOR PROVIDING OPTIMIZED PUNCTURING PATTERNS FOR TURBO ENCODED DATA IN A COMMUNICATIONS NETWORK

(75) Inventor: A. Roger Hammons, Jr., North Potomac, MD (US)

(73) Assignee: Hughes Electronics Corporation, El Segundo, CA (US)

(*) Notice: Subject to any disclaimer, the term of this patent is extended or adjusted under 35 U.S.C. 154(b) by 0 days.

(21) Appl. No.: 09/558,359

(22) Filed: Apr. 26, 2000

Related U.S. Application Data

(60) Provisional application No. 60/131,315, filed on Apr. 27, 1999.

(51) Int. Cl.[7] .............................................. H03M 13/35
(52) U.S. Cl. ...................................................... 714/790
(58) Field of Search ......................................... 714/790

(56) References Cited

U.S. PATENT DOCUMENTS

| | | | | |
|---|---|---|---|---|
| 5,910,182 A | | 6/1999 | Dent et al. ................... | 714/786 |
| 5,970,085 A | * | 10/1999 | Yi .............................. | 370/342 |
| 5,987,057 A | | 11/1999 | Song .......................... | 375/253 |
| 6,370,669 B1 | * | 4/2002 | Eroz et al. .................. | 714/774 |
| 6,519,732 B1 | * | 2/2003 | Li ............................... | 714/755 |

FOREIGN PATENT DOCUMENTS

WO      WO 00/41343      7/2000

OTHER PUBLICATIONS

LGIC, "Puncturing Algorithm for Turbo", 3GPP/TSG/RAN/WG1#4 TDOC 338/99, Apr. 19–20, 1999, pp. 1–6, Yokohama, Japan, p. 1, line 1—p. 6, last line; figure 2.

* cited by examiner

Primary Examiner—Stephen M. Baker
(74) Attorney, Agent, or Firm—John T. Whelen; Michael Sales

(57) ABSTRACT

A system and method employing a rate matching algorithm for providing an optimized pattern for puncturing parity bits of a turbo encoded data word of a given rate to produce a turbo encoded data word of a desired lower rate, to thus eliminate bits from said turbo encoded data word to be transmitted by a transmitter. The system and method determine a final amount of bits to be transmitted in the encoded data word, and determine, based on the final amount of bits in relation to the original number of bits in the encoded data word, the number of parity bits to be eliminated from transmission in the encoded data word. Because the parity bits typically have been inserted into the encoded data word by different encoders, the system and method uses a rate matching algorithm to provide an optimized pattern for puncturing the parity bits so that substantially the same number of parity bits provided by each encoder are punctured.

22 Claims, 3 Drawing Sheets

SYSTEM AND METHOD EMPLOYING A RATE MATCHING ALGORITHM FOR PROVIDING OPTIMIZED PUNCTURING PATTERNS FOR TURBO ENCODED DATA IN A COMMUNICATIONS NETWORK

The present invention claims benefit under 35 U.S.C. §119(e) of a U.S. provisional application of A Roger Hammons entitled "Rate Matching Algorithm Providing Near Optimal Puncturing Patterns for Turbo Codes", Ser. No. 60/131,315, filed Apr. 27, 1999, the entire contents of which is incorporated herein by reference.

BACKGROUND OF THE INVENTION

1. Field of the Invention

The present invention relates to a system and method employing a rate matching algorithm for providing optimized puncturing patterns for turbo encoded data in a communications network. More particularly, the present invention relates to a system and method employing a rate matching algorithm for providing an optimized pattern for puncturing parity bits of a turbo encoded data word of a given rate to produce a turbo encoded data word of a desired lower rate.

2. Description of the Related Art

Many communications devices, such as those used in satellite-based or terrestrial telecommunications networks, employ encoders for encoding data prior to transmission to increase the integrity of the transmitted data and thus reduce data receipt errors. One type of encoder suitable for use in data transmitters is referred to as a turbo encoder. A turbo encoder typically includes one or more constituent encoders which insert in the outgoing data stream one or more parity bits for each information-bearing data bit (information bit).

The number of parity bits per data bit in the outgoing data stream indicates the rate at which the outgoing data stream is encoded. For example, a rate $1/3$ systematically-encoded data stream includes the input information-bearing data bits, as well as two parity bits per each information bit. In other words, the length of a data stream that is rate $1/3$ encoded is increased by a factor of three. Similarly, a rate $1/2$ systematically-encoded data stream includes one parity bit per each real information bit in the data stream. Hence, the length of a data stream that is rate $1/2$ encoded is increased by a factor of two.

Due to data capacity limitations that may be present in certain communications networks, it is often necessary to decrease the rate and hence, the length, of a rate encoded data stream. For example, many communications networks transmit data in data packets or frames of a fixed size, which are transmitted in a time-division multiple access (TDMA) transmission scheme. Due to the fixed length of a data frame, a rate $1/3$ data stream may be too long to fit within one data frame. However, the length of a data frame may be sufficient to contain a shorter rate $1/2$ data stream. Hence, it may be desirable to decrease a rate $1/3$ data stream to a rate $1/2$ data stream so the data stream can be transmitted within one data frame.

One method of decreasing the rate of a data stream is referred to as puncturing the data stream. When a data stream is punctured, certain bits of the data stream are eliminated from the data stream transmission. For example, if a rate $1/3$ data stream having a length of 3000 bits is punctured to a rate $1/2$ data stream having a length of 2000 bits, 1000 bits of the rate $1/3$ data stream are not transmitted.

In many systems employing convolutional coding, puncturing is ordinarily performed as a part of channel encoding so that optimal or nearly optimal puncturing patterns can be applied. In certain code-division multiple access (CDMA) systems employing convolutional encoding, the puncturing is performed by a generic "rate matching" function apart from the encoder, in order to simplify multiplexing of many disparate data streams onto a common set of physical channels. In such an environment, the available payload would not be known at the encoder and the required puncturing patterns would be complex. For rate $1/3$ turbo codes, in which the turbo encoder produces two parity bits for every systematic information bit as discussed above, it is preferable to avoid puncturing any of the systematic bits and to spread the puncturing between constituent encoders as evenly as possible. However, known rate matching algorithms for systems using convolutional codes fail to meet the above mentioned turbo code puncturing guidelines.

Therefore, a need exists for a method and system for providing an algorithm for evenly puncturing parity bits of a turbo encoded data stream without puncturing any systematic data bits of the data stream.

SUMMARY OF THE INVENTION

An object of the present invention is to provide a system and method employing a rate matching algorithm for providing optimized puncturing patterns for turbo encoded data in a communications network.

Another object of the present invention is to provide a system and method employing a rate matching algorithm for providing an optimized pattern for puncturing parity bits of a turbo encoded data word of a given rate to produce a turbo encoded data word of a desired lower rate, to thus eliminate bits from said turbo encoded data word to be transmitted by a transmitter.

A further object of the present invention is to provide a system and method employing a rate matching algorithm for providing optimized patterns for puncturing parity bits that have been inserted into a turbo encoded data word by different encoders so that substantially the same amount of parity bits provided by each encoder are punctured.

These and other objects of the present invention are substantially achieved by providing a system and method for puncturing bits of an encoded data word to reduce a total number of bits in the encoded data word to be transmitted by a transmitter of a communications system. The bits include information bits and parity bits. The system and method operate to determine a final desired number of bits to be transmitted in the encoded data word, and to determine a respective number of parity bits associated with each respective number of information bits. The system and method establish a first variable for identifying positions of the information bits in the data word, and establish a respective parity variable associated with each respective number of parity bits. For example, if the encoded data word is rate $1/3$ encoded, two parity bits are associated with each information bit. Therefore, the system and method will establish two parity variables.

The system and method then operate to eliminate certain parity bits from transmission in the encoded word based on values of the first variable and each respective parity variable so that the final desired number of bits remain in the encoded data word. In doing so, the system and method organizes the bits into a systematic group and one or more parity groups. The system and method selects certain groups based on the final number of bits and eliminates at least one parity bit from each of the selected groups. To do this, the system and method periodically changes the values of the first variable and each respective parity variable based on at least one constant which has been determined based on the final amount, and determines whether to eliminate any of the parity bits of a particular group during each period in which the values of the first variable and each respective parity variable are changed.

BRIEF DESCRIPTION OF THE DRAWINGS

These and other objects, advantages and novel features of the invention will be more readily appreciated from the following detailed description when read in conjunction with the accompanying drawings, in which.

DETAILED DESCRIPTION OF THE PREFERRED EMBODIMENTS

Figure 1:
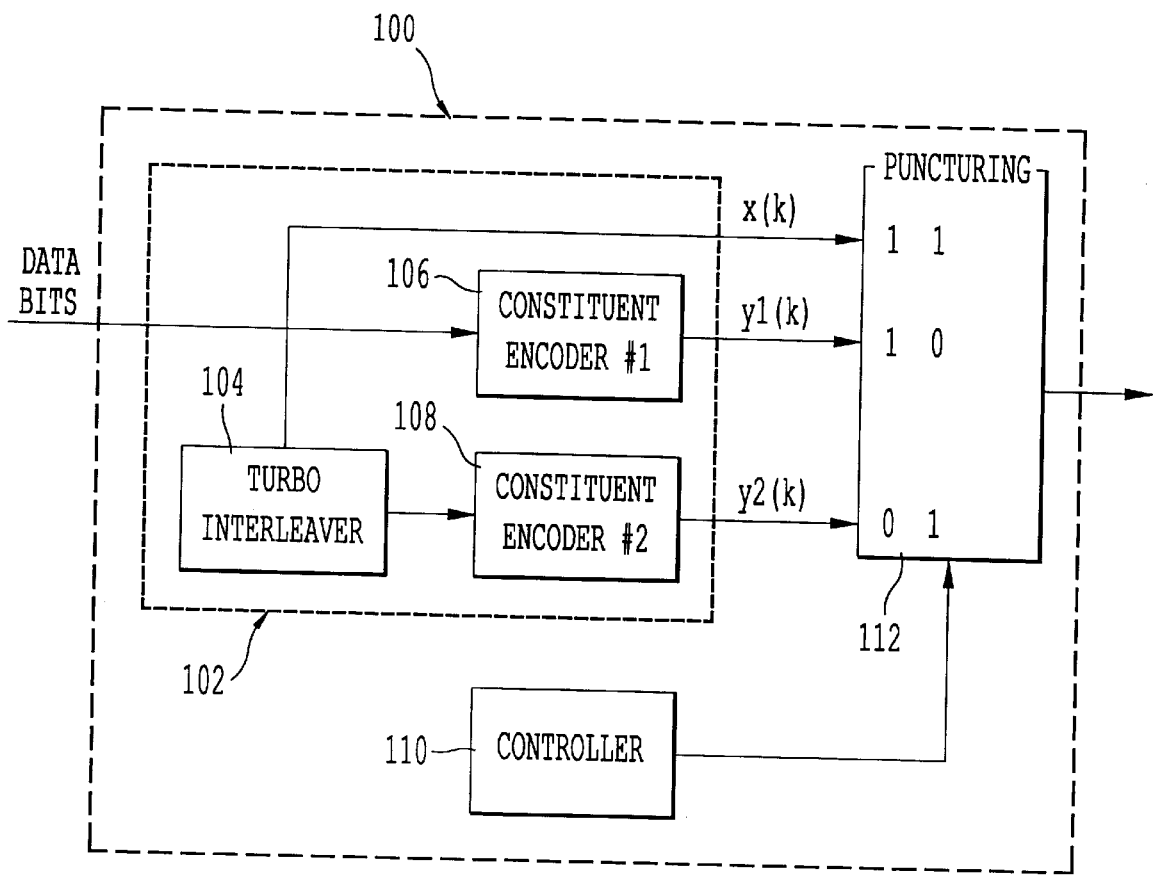
FIG. 1 is a conceptual block diagram of a user terminal employing a system and method according to an embodiment of the present invention.

FIG. 1 is a conceptual block diagram illustrating an example of a transmitter 100, for use in a communications network such as a satellite-based or terrestrial telecommunications network, and which employs a system and method according to an embodiment of the present invention. As illustrated, the transmitter 100 includes a turbo encoder 102 comprising a turbo interleaver 104 and constituent encoders 106 and 108.

A controller 10 for performing a puncturing algorithm according to an embodiment of the present invention applies an appropriate puncturing pattern to the output of the turbo encoder 102 at a puncturing position 112 as will now be described. It is noted that the turbo encoder 102 and controller 110 could be implemented as software in a digital signal processor (DSP) or as logic circuitry in a very large scale integration (VLSI) configuration. It is also possible for the turbo encoder 102, for example, to be implemented as circuitry in a VLSI configuration while the controller 110 resides in software in a DSP, or vice-versa.

Like conventional convolutional codes, turbo codes are capable of supporting variable channel code rates because the output of the encoder 102 can be punctured by applying simple periodic puncturing patterns. This process is illustrated in FIG. 1 as discussed above, which shows a standard turbo encoder 102 followed by a puncturing function applied at puncturing position 112. The puncturing function is represented by a binary array governing the puncturing of the coded bits in time.

As can be appreciated by one skilled in the art, the output of the turbo encoder is multiplexed in time. That is, if $x(k)$ represents the k-th input bit and $y1(k)$ and $y2(k)$ represent the corresponding parity bits produced by the two constituent encoders 106 and 108, then the rate ⅓ turbo code produces the following sequence of coded bits: $x(1), y1(1), y2(1); x(2). y1(2), y2(2); \ldots x(L), y1(L), y2(L)$. A well-known puncturing pattern for producing a rate ½ turbo code from a rate ⅓ turbo encoder is shown in FIG. 1. As illustrated, the output of the encoder 102 after puncturing at the puncturing component 112 is given by the sequence:

$x(1),y1(1);x(2),y2(2);x(3),y1(3); \ldots$ corresponding to the following linear periodic puncturing pattern: 110 101 This coding technique has been extensively investigated in the literature and gives excellent performance.

Specifically, in the puncturing array shown at puncturing position 112, the value "1" indicates transmission of the corresponding coded bit, and the value "0" indicates that the corresponding coded bit is not transmitted. The pattern is applied periodically to the outputs of the constituent encoders. Accordingly, in the first group of three bits consisting of one systematic data bit and two parity data bits, the parity bit provided by constituent encoder 106 is punctured. However, in the second group of three bits, the parity bit provided by constituent encoder 108 is punctured.

The rate matching algorithm according to an embodiment of the present invention that will now be discussed provides optimal or nearly optimal puncturing of turbo coded data when performed after the channel encoding. This algorithm has low implementation complexity yet succeeds in spreading the puncturing in a balanced maimer between constituent encoders.

The following variables represent the characteristics of the encoded data:

Encoded data (code word): $c[0], c[1], c[2], \ldots c[Nc-1]$

Code word length (bits): Nc

Available payload (bits): Ni

Channel code rate: R

It is assumed that Ni<Nc, so that puncturing is required to make encoded data fit the available payload. For illustrative purposes, it is also assumed in this example that input code rate R=⅓ and that the encoded data are presented in the customary fashion for a rate ⅓ turbo code, that is, a systematic bit followed by the corresponding parity bit from the first constituent encoder followed by the corresponding parity bit from the second constituent encoder followed by the next systematic bit, and so on. Thus, the coded bits $c[3i]$ are the systematic bits, the coded bits $c[3i+1]$ are the parity bits produced by the first constituent encoder 106, and the coded bits $c[3i+2]$ are the parity bits produced by the second constituent encoder 108.

The following represents a Pseudo-Design Language Description (using C-language conventions) of the algorithm according to an embodiment of the present invention, taking into account the variables defined above:

D=Ni–Nc;
P=2*Nc/3;
d=D/gcd(D,P);
p=P/gcd(D,P);
s1=0;
s2=((int)(p/2)*d)%p;
for(i=0;i<P;i=i+2)
{m=3*i/2;
s1+=d;
if(s1>=p){Puncture c[m+1]; s1–=p;}
s2+=d;
if(s2>=p){Puncture c[m+2]; s2–=p;}}

It is noted that in the above pseudo-code, the integer function gcd (x, y) returns the greatest common divisor of the integers x and y, the term "+=" means to increase the value of the variable on the left side of the term (e.g., s1) by the value of the variable on the right side of the term (e.g., d), the term "−=" means to decrease the value of the variable on the left side of the term (e.g., s1) by the value of the variable on the right side of the term (e.g., p), and the term "%" represents niodulo division. From the pseudo-code description, the following basic design principles are clear: (1) Each parity stream is punctured as uniformly as possible by using a pattern that removes on average d of every p parity bits; (2) The puncturing pattern for the second stream of parity bits (from second constituent encoder) is the same as that of the first but offset from the first by roughly ½ the length of the pattern.

These design principles are implemented very simply via a pair of modulo-p accumulators, s1 and s2, one for each parity stream. The accumulators are incremented by d for each encoded information bit and reduced by p when necessary to prevent overflow. Reduction by p triggers the puncturing of the corresponding parity bit from that stream. The puncture patterns for the two constituent encoders are effectively staggered by using different initializations for the two accumulators.

Figure 2:
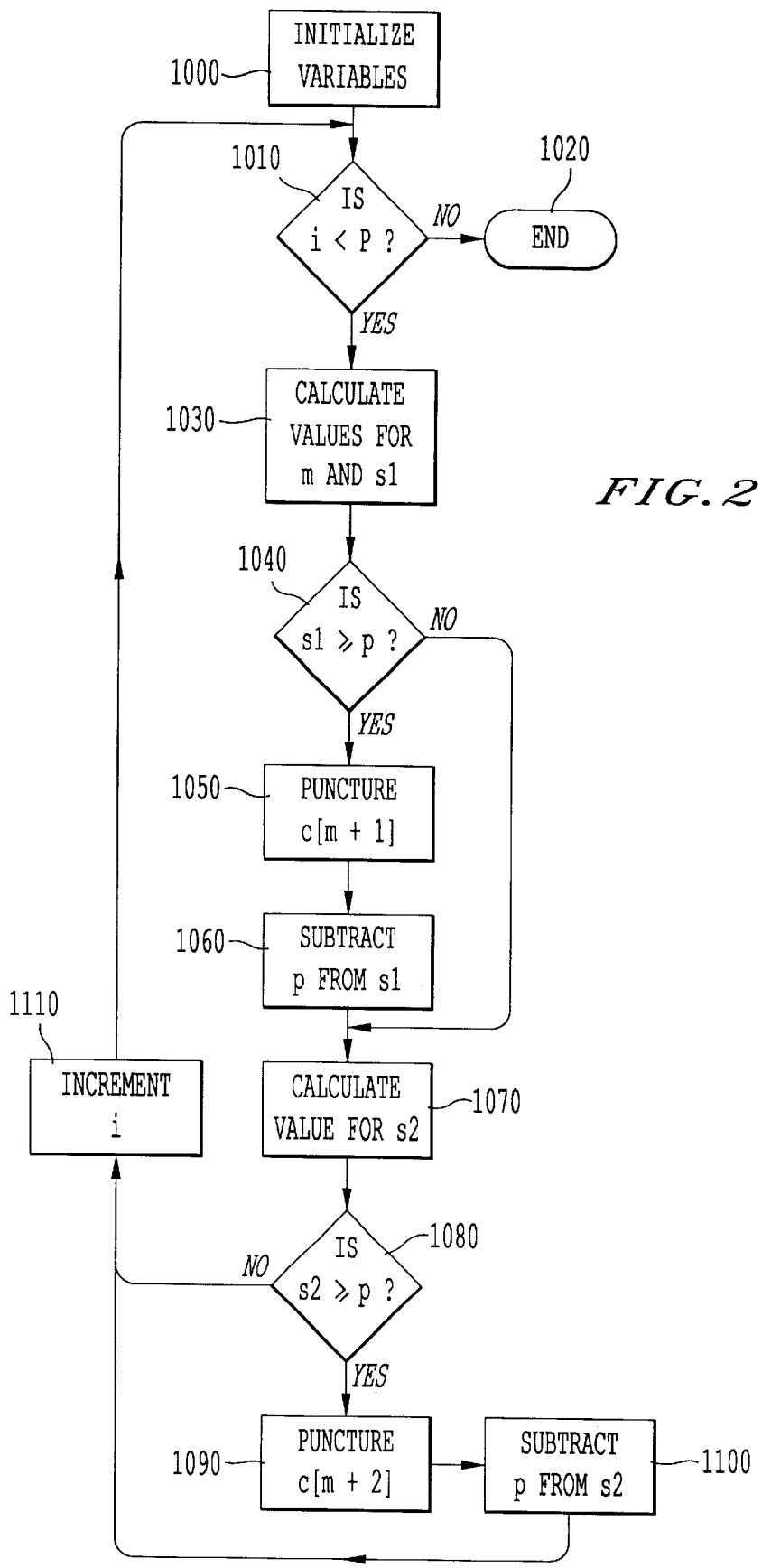
FIG. 2 is a flowchart illustrating exemplary processing steps performed in accordance with a puncturing algorithm provided by the system and method employed in the user terminal shown in FIG. 1.

The operation of the controller 110 that executes the algorithm specified by the pseudo code described above can be better appreciated in view of the flowchart shown in FIG. 2. As shown in step 1000, the controller 110 initializes the variables discussed above, namely, D, P, d, p, s1 and s2. The processing then continues to step 1010 where it enters the "For" loop shown in the pseudo code. Specifically, the processing determines in step 1010 whether the value of "i", the loop counting variable, is less than P. If not, this is an indication that all groups of the systematic bits and their associated parity bits (in this example, 3 bit groups), have been processed, and the processing proceeds to step 1020 and ends.

However, if the value of i is less than the value of P, the processing proceeds to step 1030, where the values of variables "m" and "s1" are changed according to the equations in the pseudo code. It is noted that the value of s1 is incremented by the value of d. The processing then continues to step 1040 where it is determined whether the new value of s1 is greater than or equal to the value of p. If so, the processing proceeds to step 1050 where the parity bit output by constituent encoder 106 is punctured. The processing then proceeds to step 1060 where the value of s1 is decremented by the value of p, and the processing continues to step 1070. It is noted, however, if it is determined in step 1040 that the new value of s1 is not greater than or equal to the value of p, the processing proceeds from step 1040 to step 1070, skipping steps 1050 and 1060.

In step 1070, the processing increments the value of s2 by the value of d. The processing the proceeds to step 1080 where it is determined whether the new value of s2 is greater than or equal to the value of p. If so, the processing proceeds to step 1090 where the parity bit output by constituent encoder 108 is punctured. The processing then proceeds to step 1100 where the value of s2 is decremented by the value of p, and the processing returns to step 1010. It is noted, however, if it is determined in step 1080 that the new value of s2 is not greater than or equal to the value of p, the processing proceeds from step 1080 to step 1010, skipping steps 1090 and 1100. When the processing returns to step 1010, the value of "i" is incremented in step 1110 as indicated, and the processing repeats as discussed above.

The following tables represent examples of the puncturing pattern achieved by the pseudo code and operation of the controller 110 as described above. In these examples the input code rate is $R=\frac{1}{3}$. Table 1 below illustrates an example of the ideally balanced puncturing pattern for rate ½ as produced by the rate matching algorithm, with d=1 and p=2.

TABLE 1

Example of Puncturing Pattern for Rate 1/2

| i | m | s1 | s2 | Puncturing Pattern | | |
|---|---|----|----|----|----|----|
|   |   | 0  | 1  | c[m] | c[m + 1] | c[m + 2] |
| 0 | 0 | 1  | 2  | 1 | 1 | 0 |
| 2 | 3 | 2  | 1  | 1 | 0 | 1 |

Table 2 below illustrates an example of the ideally balanced puncturing pattern for rate ⅔ as produced by the rate matching algorithm, with d=3 and p=4.

TABLE 2

Example of Puncturing Pattern for Rate 2/3

| i | m | s1 | s2 | Puncturing Pattern | | |
|---|---|----|----|----|----|----|
|   |   | 0  | 2  | c[m] | c[m + 1] | c[m + 2] |
| 0 | 0 | 3  | 5  | 1 | 1 | 0 |
| 2 | 3 | 6  | 4  | 1 | 0 | 0 |
| 4 | 6 | 5  | 3  | 1 | 0 | 1 |
| 6 | 9 | 4  | 6  | 1 | 0 | 0 |

Table 3 below illustrates an example of the ideally balanced puncturing pattern for code rate 5/12 as produced by the rate matching algorithm, with d=3 and p=10.

TABLE 3

Example of Puncturing Pattern for Rate 5/12

| i | m | s1 | s2 | Puncturing Pattern | | |
|---|---|----|----|----|----|----|
|   |   | 0  | 5  | c[m] | c[m + 1] | c[m + 2] |
| 0  | 0  | 3  | 8  | 1 | 1 | 1 |
| 2  | 3  | 6  | 11 | 1 | 1 | 0 |
| 4  | 6  | 9  | 4  | 1 | 1 | 1 |
| 6  | 9  | 12 | 7  | 1 | 0 | 1 |
| 8  | 12 | 5  | 10 | 1 | 1 | 0 |
| 10 | 15 | 8  | 3  | 1 | 1 | 1 |
| 12 | 18 | 11 | 6  | 1 | 0 | 1 |
| 14 | 21 | 4  | 9  | 1 | 1 | 1 |
| 16 | 24 | 7  | 12 | 1 | 1 | 0 |
| 18 | 27 | 10 | 5  | 1 | 0 | 1 |

For purposes of illustration only, the rate matching algorithm is discussed above in relation to a rate ⅓ turbo code, produced by a turbo encoder 102 comprising two constituent encoders 106 and 108, each of which produces one parity bit per input information bit. However, as will now be demonstrated, the algorithm is applicable to other code rates.

For example, consider a case in which the code rate is $R=k/n$ (every k information bits produces $r=n-k$ parity bits) and the puncturing is to be spread over the r parity streams in a balanced manner. The following modification of the rate matching algorithm is a straightforward adaptation that conforms to the basic concept and meets the balanced puncturing objective.

The following represents a pseudo-design language description (using C-language conventions) of the algorithm according to another embodiment of the present invention, taking into account the variables Ni, Nc and R as defined above, and that encoded data (code word) is represented by the terms: c[0], c[1], c[2], . . . c[Nc−1] as discussed above:

```
D=Ni−Nc;
P=Nc*(1−R);
r=n−k;
d=D/gcd(D,P);
p=P/gcd(D,P);
for(j=0;j<r;++j)s[j]=(j*(int)(p/r)*d)%p;
for(i=0;i<P;i=i+r){
   m+(n*i)/r;
   for(j=0;j<r;++j){
      s[j]+=d;
      if(s[j]>=p){
         Puncture c[m+j+k];
         s[j]−=p;
      }
   }
}
```

Figure 3:
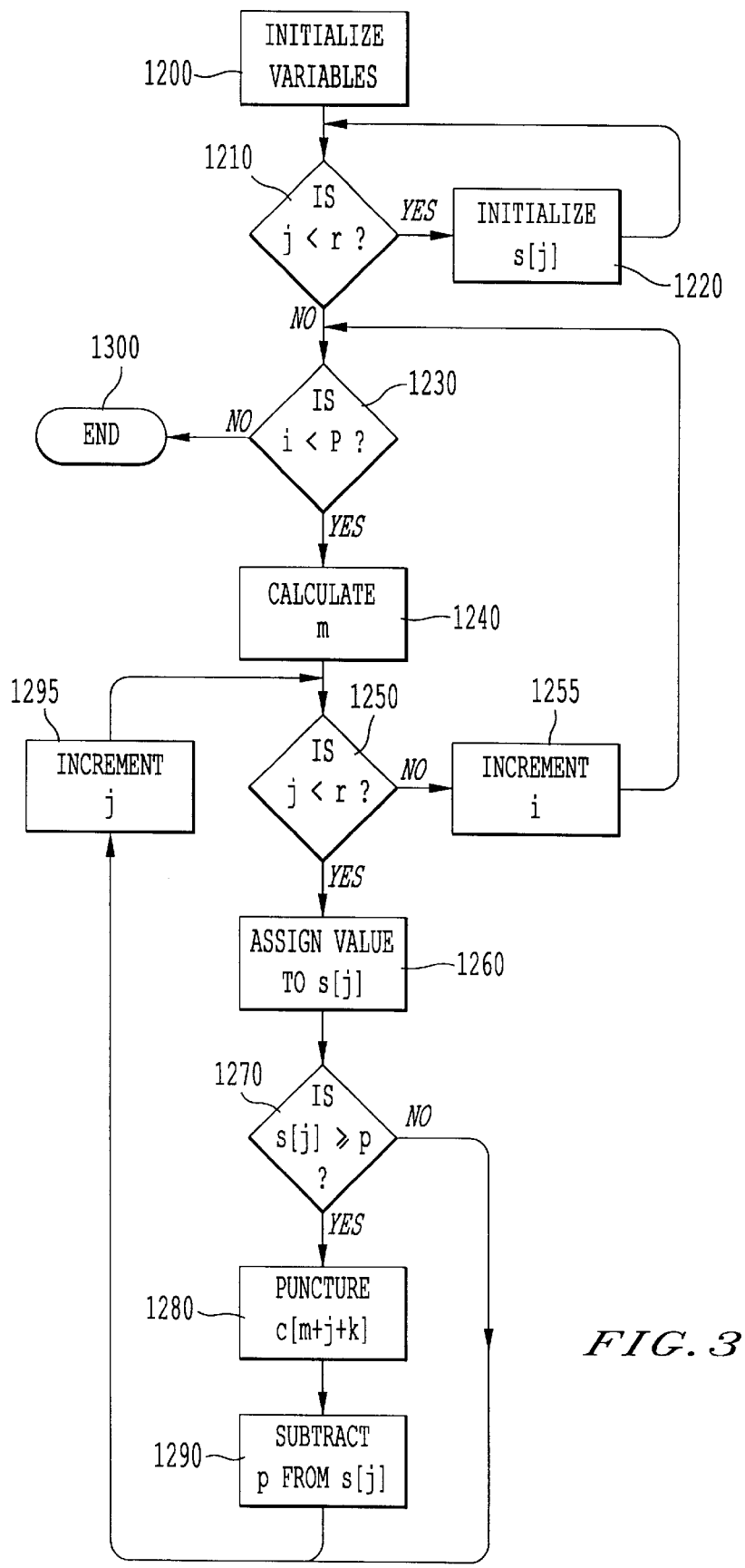
FIG. 3 is a flowchart illustrating exemplary processing steps performed in accordance with another puncturing algorithm provided by the system and method employed in the user terminal shown in FIG. 1.

The operation of the controller 1110 executing the pseudo code described above can be better appreciated in view of the flowchart shown in FIG. 3 As shown in step 1200, the controller 1110 initializes the variables discussed above, namely, D, P, r , d and p. The processing then continues to step 1210 where it enters the "For" loop shown in the pseudo code to initialize the accumulators s[j] as indicated. Specifically, the processing determines in step 1210 whether the value of "j", the loop counting variable, is less than r. If so, the processing proceeds to step 1220, where the values of variable "[j]" is initialized according to the equation in the pseudo code. The processing repeats as long as j is less than r, with j being incremented by "1" each time the processing returns to step 1210 (as represented by the term "++j" in the pseudo code) and before the comparison of j to r is made.

Once it is determined in step 1210 that j is not less than r, the processing proceeds to step 1230 where it is determined whether the value of "i", a loop counter, is less than the value of P. It is noted that the first time this step is reached, the value of i is initialized to zero. If the value of i is less than the value of P, the processing proceeds to step 1240 where the value of "m" is set according to the equation in the pseudo code.

The processing then proceeds to step 1250 where it is determined whether the value of j is less than the value of r. It is noted that the first time this step is reached after each time the processing performs step 1240, the value of j is initialized to zero. If the value of j is less than the value of r, the processing proceeds to step 1260 where the value of variable s[j] is changed as indicated in the pseudo code. The processing proceeds the step 1270 where it is determined whether the new value of s[j] is greater than or equal to the value of p. If the value of s[j] greater than or equal to the value of p, the bit c[m+j+k] is punctured in step 1280, as indicated in the pseudo code. The processing then proceeds to step 1290, where the value of s[j] is decremented by the value of p, as indicated in the pseudo code. The processing then returns to step 1250, and repeats as discussed above.

When the processing returns to step 1250, the value of j is incremented in step 1295 as indicated in the pseudo code before the comparison of j to r is made. If it is determined in step 1250 that the value of j is not less that or equal to the value of r, the processing returns to step 1230 without performing steps 1260 through 1290. In returning to step 1230, the value of i is incremented in step 1255 as indicated in the pseudo code before the comparison of i to P is made. If the value of i is less than P, the processing proceeds to step 1240 where the value of m is set as discussed above, and then to step 1250 where the processing relating to this step as discussed above is performed. It is noted that as mentioned above when the processing proceeds to step 1250 from step 1240, the value of j is initialized to zero. However, if it is determined in step 1230 that the value of i is not less than P, it is determined that the processing has been performed for all groups of bits (i.e., all groups of systematic bits and associated parity bits). The processing thus proceeds to step 1300 and ends.

It is noted that the staggering of the pattern could be done differently. For instance, the initialization of the accumulators s[j] could also be done as follows and yield a similar effect:

for(j=0;j<r;++j)s[j]=((int)(j*p/r)*d)%p;

In fact, it is also possible under certain circumstances (e.g., if the number of punctured bits is divisible by the number of constituent encoders) for the staggers to all be the same since the turbo interleavers effectively randomize the puncturing over time. This would enable a simplified implementation in which one set of variables controls the puncturing of all constituent encoders' outputs. Optimization of the specific choice of staggers could also be done to best match the actual turbo codes and code rates of interest.

In another variation of the algorithm, it is noted that it is not necessary to treat all of the parity streams equally. In more complex turbo codes, in which, for example, the constituent encoders produce two or more parity bits per information bit, it may be preferable to puncture certain of the parity streams less than others. This can be accomplished using the above rate matching algorithm by making the values d and p functions of the parity stream j. The algorithm would then increment accumulator s[j] by d[j] modulo p[j], etc. The staggers would again be dependent on the parity stream and again could be non-uniform in this case.

As can be appreciated from the above description, the algorithms according to the invention meet the puncturing guidelines with low complexity. When rate matching is performed right after channel encoding, the puncturing pattern provided by the algorithm can be applied directly to the encoded data. When rate matching is performed after channel interleaving, the rate matching algorithm is preferably applied after first inverting the channel interleaving. It is also noted that the above algorithms can be applied to any system using turbo codes in which rate matching is performed apart from the channel encoder.

Although only a few exemplary embodiments of the present invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims.

What is claimed is:

1. A method for puncturing bits of an encoded data word to reduce a total number of bits in said encoded data word to be transmitted by a transmitter of a communications system, said bits including information bits and parity bits, the method comprising the steps of:

determining a final amount of said bits to be transmitted in said encoded data word;

determining a respective number of said parity bits associated with each respective number of said information bits;

establishing a first variable for identifying positions of said information bits in said data word;

establishing a respective parity variable associated with each of said respective number of parity bits; and eliminating certain of said parity bits from transmission in said encoded word based on values of said first variable and each said respective parity variable so that said final amount of bits remain in said encoded data word.

2. A method as claimed in claim 1, further comprising the step of:

organizing said bits into groups, each groups including an amount of said parity bits equal to said respective number of said parity bits and an amount of said information bits equal to said respective number of information bits.

3. A method as claimed in claim 2, wherein said eliminating step includes the step of:

selecting certain of said groups as selected groups based on said final number of bits; and eliminating at least one of said parity bits from each of said selected groups.

4. A method as claimed in claim 1, wherein said eliminating step includes the steps of:

periodically changing said values of said first variable and each said respective parity variable based on at least one constant which has been determined based on said final amount; and determining whether to eliminate any of said parity bits during each period in which said values of said first variable and each said respective parity variable are changed.

5. A method as claimed in claim 1, wherein:

when said encoded word is rate k/n encoded, said each respective number of information bits equals k and said respective number of parity bits equals n minus k.

6. A method as claimed in claim 5, wherein:

when said encoded word rate is ⅓ encoded, said each respective number of information bits equals 1 and said respective number of parity bits equals 2; and said parity variable establishing step establishes two of said respective parity variables.

7. A method as claimed in claim 1, wherein:

said encoded data word is a turbo encoded data word.

8. A computer readable medium of instructions, adapted to control a processor to puncture bits of an encoded data word to reduce a total number of bits in said encoded data word to be transmitted by a transmitter of a communications system, said bits including information bits and parity bits, the computer readable medium of instructions comprising:

a first set of instructions, adapted to control said processor to determine a final amount of said bits to be transmitted in said encoded data word;

a second set of instructions, adapted to control said processor to determine a respective number of said parity bits associated with each respective number of said information bits;

a third set of instructions, adapted to control said processor to establish a first variable for identifying positions of said information bits in said data word;

a fourth set of instructions, adapted to control said processor to establish a respective parity variable associated with each of said respective number of parity bits; and a fifth set of instructions, adapted to control said processor to eliminate certain of said parity bits from transmission in said encoded word based on values of said first variable and each said respective parity variable so that said final amount of bits remain in said encoded data word.

9. A computer readable medium of instructions as claimed in claim 8, further comprising:

a sixth set of instructions, adapted to control said processor to organize said bits into groups, each groups including an amount of said parity bits equal to said respective number of said parity bits and an amount of said information bits equal to said respective number of information bits.

10. A computer readable medium of instructions as claimed in claim 9, wherein said fifth set of instructions is further adapted to control said processor to:

select certain of said groups as selected groups based on said final number of bits; and eliminate at least one of said parity bits from each of said selected groups.

11. A computer readable medium of instructions as claimed in claim 8, wherein said fifth set of instructions is further adapted to control said processor to:

periodically change said values of said first variable and each said respective parity variable based on at least one constant which has been determined based on said final amount; and determine whether to eliminate any of said parity bits during each period in which said values of said first variable and each said respective parity variable are changed.

12. A computer readable medium of instructions as claimed in claim 8, wherein:

when said encoded word is rate k/n encoded, said each respective number of information bits equals k and said respective number of parity bits equals n minus k.

13. A computer readable medium of instructions as claimed in claim 12, wherein:

when said encoded word rate is ⅓ encoded, said each respective number information bits equals 1 and said respective number of parity bits equals 2; and said fourth set of instructions controls said processor to establish two of said respective parity variables.

14. A computer readable medium of instructions as claimed in claim 8, wherein:

said encoded data word is a turbo encoded data word.

15. A system for puncturing bits of an encoded data word to reduce a total number of bits in said encoded data word to be transmitted by a transmitter of a communications system, said bits including information bits and parity bits, the system comprising:

a first determiner, adapted to determine a final amount of said bits to be transmitted in said encoded data word;

a second determiner, adapted to determine a respective number of said parity bits associated with each respective number of said information bits;

a first variable component, adapted to establish a first variable for identifying positions of said information bits in said data word;

a parity variable component, adapted to establish a respective parity variable associated with each of said respective number of parity bits; and a bit eliminator, adapted to eliminate certain of said parity bits from transmission in said encoded word based on values of said first variable and each said respective parity variable so that said final amount of bits remain in said encoded data word.

16. A system as claimed in claim 15, further comprising:

a bit organizer, adapted to organize said bits into groups, each groups including an amount of said parity bits equal to said respective number of said parity bits and an amount of said information bits equal to said respective number of information bits.

17. A system as claimed in claim 16, wherein said bit eliminator is further adapted to:

select certain of said groups as selected groups based on said final number of bits; and eliminate at least one of said parity bits from each of said selected groups.

18. A system as claimed in claim 15, wherein said bit eliminator is further adapted to:

periodically change said values of said first variable and each said respective parity variable based on at least one constant which has been determined based on said final amount; and determine whether to eliminate any of said parity bits during each period in which said values of said first variable and each said respective parity variable are changed.

19. A system as claimed in claim 15, wherein:

when said encoded word is rate k/n encoded, said each respective number of information bits equals k and said respective number of parity bits equals n minus k.

20. A system as claimed in claim 19, wherein:

when said encoded word rate is ⅓ encoded, said each respective number of information bits equals 1 and said respective number of parity bits equals 2; and said parity variable establishing step establishes two of said respective parity variables.

21. A system as claimed in claim 15, wherein:

said encoded data word is a turbo encoded data word.

22. A system as claimed in claim 15, wherein:

at least one of said first determiner, said second determiner, said first variable component, said parity variable component, and said bit eliminator are employed in a VLSI configuration.

* * * * *